United States Patent [19]
Burris et al.

[11] Patent Number: 5,533,165
[45] Date of Patent: Jul. 2, 1996

[54] SMART STRUCTURE EGRESS CHANNEL

[76] Inventors: Kelly K. Burris, 3132 Lafayette Ave., St. Louis, Mo. 63104; Herbert G. Smith, Jr., 1932 Cherokee Trail La., St. Louis, Mo. 63031

[21] Appl. No.: 298,042

[22] Filed: Aug. 30, 1994

[51] Int. Cl.$^6$ .................................................... G02B 6/00
[52] U.S. Cl. ........................................ 385/134; 385/135
[58] Field of Search ................................... 385/134, 135, 385/137; 174/48, 50.5, 65 R

[56] References Cited

U.S. PATENT DOCUMENTS

| | | | |
|---|---|---|---|
| 4,222,632 | 9/1980 | Eichweber | 385/100 |
| 4,948,218 | 8/1990 | Kobayashi et al. | 385/24 |
| 5,029,958 | 7/1991 | Hodge et al. | 385/135 |
| 5,109,467 | 4/1992 | Hogan | 385/135 |
| 5,224,199 | 6/1993 | Cortijo | 385/135 |
| 5,261,024 | 11/1993 | Allen et al. | 385/135 |
| 5,367,598 | 11/1994 | Devenish et al. | 385/135 |

*Primary Examiner*—Rodney B. Bovernick
*Assistant Examiner*—Robert E. Wise
*Attorney, Agent, or Firm*—Veo Peoples, Jr.; J. William Stader; Peoples & Hale

[57] ABSTRACT

A smart structure egress channel is disclosed that provides a central location for multiple embedded sensors to come together and then exit the structure. A plurality of holes allow sensors to enter the channel. A communication connector provides an exit point for sensor transmittal. Maintenance of the various devices within the smart structure egress channel is possible through an access cover and access extension which extends above the channel. The exterior shape of the channel is designed to function within a primary load-carrying structural member such as a composite structure within a modern aircraft.

8 Claims, 4 Drawing Sheets

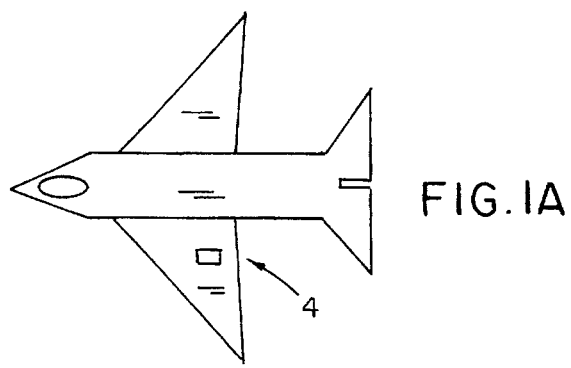
FIG.1A
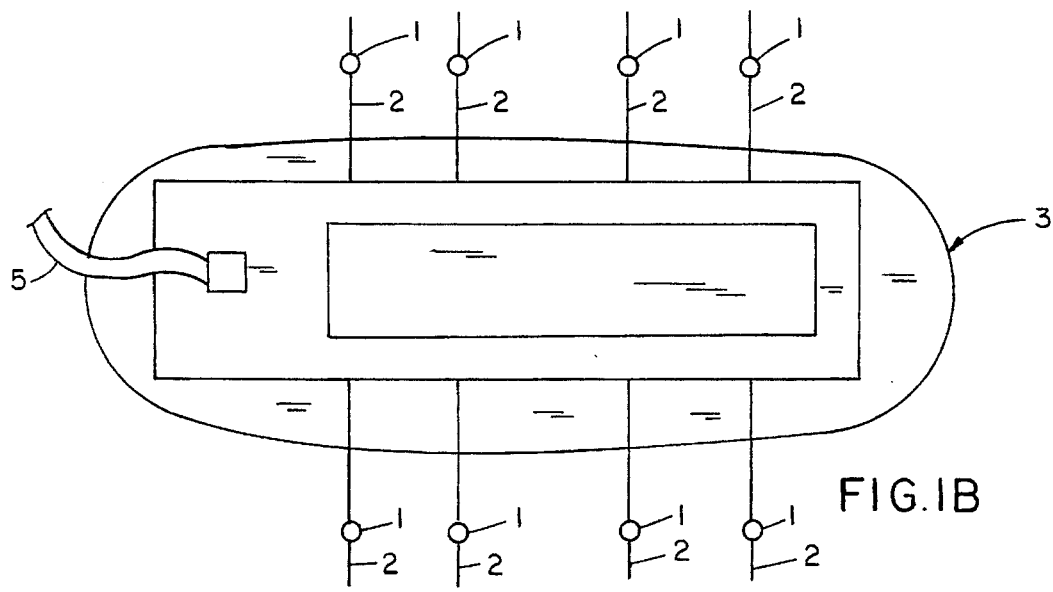
FIG.1B
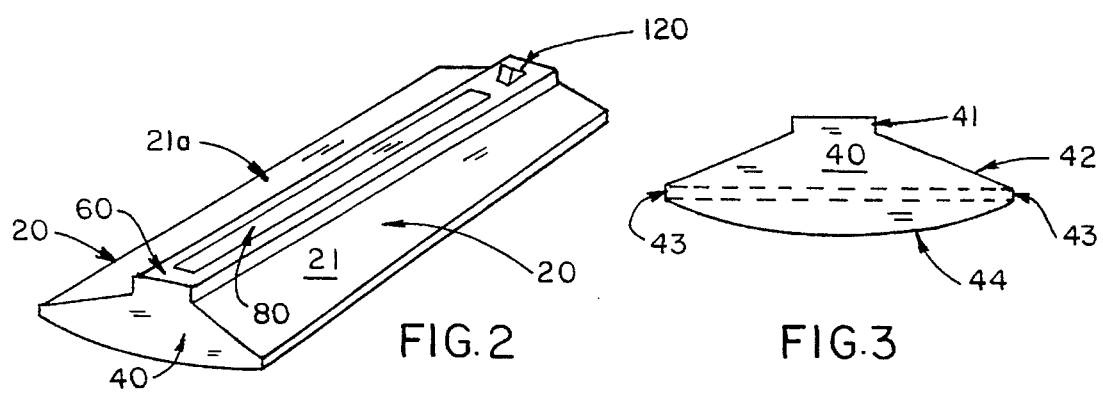
FIG.2
FIG.3

1

SMART STRUCTURE EGRESS CHANNEL

BACKGROUND OF INVENTION

1. Field of Invention

The present invention relates to smart structure egress channels, particularly to a channel providing a central location for multiple sensors embedded therein to come together for both signal processing and signal egress from the structure.

2. Description of Prior Art

With the advent of microchip technology and advanced communications, it is now advantageous to use remote sensors to monitor and transmit the physical status of certain structures. This information can be displayed and utilized to alert humans of impending structural failure. These so-called 'smart structures' can communicate a building's environmental status either floor by floor or room by room. Aircraft smart structures can monitor and warn one of a variety of conditions which affect flight capability and crew safety.

It is advantageous to have the integral sensors within smart structures transmit their output through a central location or junction. A central junction where output signals can be processed, enables the transmission of data from a single exit point in the structure. Also a central junction provides a maintenance port for servicing the sensors.

Current aircraft structures offer a unique challenge to the gathering of sensor information and their ultimate use. The multi-laminate design of modern aircraft necessitates an embedded junction device which is compact, able to survive repeated strains, lightweight and which conforms to the configuration of the aircraft's structure. However, the junction site is desired to accommodate a variety of sensor inputs and a single output. Additionally, easy access is important so as to repair and replace the sensor and update the sensors as time and technology dictate. Currently, the installation and use of sensor inputs are complex and expensive. Typically each sensor cable is terminated at the exterior of the composite structure. Each sensor cable is protected by a collar. The tremendous danger involved is that at the exterior, collar and sensor egress point, the sensor cable will accidently shear off during the manufacturing process. To guard the sensor cable against this occurrence several layers are placed over the sensor, collar, and exterior interface. With the presence of multiple sensors, the labor and additional materials may substantially increase the cost of manufacturing a composite structure.

Attempts have been made to use existing electrical junction boxes as sensor junction sites, but have met with little success. See Rita Robison, 'Smart Structures', *Civil Engineering*, November 1992, p. 66–68. In the Robison article, an ordinary electrical conduit box was used to house the sensor outputs.

Such electrical conduit or junction boxes are well known in the prior art. For example U.S. Pat. No. 5,216,203 ('203) discloses a typical design. Such conduit junction boxes are unable to accommodate a sufficient number of sensor inputs. That is, such electrical junction boxes cannot accommodate more that about four electrical inputs. Additionally, the junction boxes are incompatibly heavy and bulky for the size and weight restrictions in modern aircraft. Furthermore, the inside of a typical electrical junction box is inaccessible after project completion. Detailed maintenance would be troublesome, if at all possible, to undertake. The prior art junction boxes are not able to sustain the placement of a significant load. The prior art junction boxes are placed in locations which were not primary load bearing locations. Besides being incapable of handling a significant load, the prior art junction boxes are incapable surviving the temperatures necessary in the creation of current composite structures. For instance a typical plastic junction box can only survive to temperatures of 140° F. However, the processing of many composite structures occurs at temperatures up to 350° F. Another material which the prior art junction box uses is aluminum. However the combination of a aluminum junction box and carbon-based fiber used in a typical composite structure will create a galvanic cell and corrode an aluminum junction box.

Other electrical housing boxes suffer similar drawbacks to those discussed above. Housing units for transformers (see U.S. Pat. No. 5,177,325) electromechanical equipment (see U.S. Pat. No. 5,029,270) and portable power distribution equipment (see U.S. Pat. No. 5,202,538) are all unsuitable in size, weight and design. They lack sufficient interior detail and properly sized holes to accommodate sensor input.

A design which would eliminate these deficiencies would be a welcomed advancement in the art.

OBJECTS OF THE INVENTION

An object of the invention is to provide novel access into smart structures which avoids the drawbacks of the prior art.

Still another object of the present invention is to provide a central point for sensor input and data retrieval.

Yet another object of the present invention is to provide an improved ability to service sensor connections.

A further object is to provide a central point to which sensor data may be transmitted.

An additional object of the invention is to provide a structure which accommodates sensing at multiple location within the structure.

A final object of the invention is to provide a small, compact, lightweight structure which conforms to aircraft multi-laminate structures.

SUMMARY OF THE INVENTION

The invention is a smart structure egress channel to be used in composite structures. The device provides a central location for multiple embedded sensors to come together for both signal processing and signal egress. The invention consists of two side panels and a double channel. The channel contains a plurality of holes through which sensors may enter. At one end of the smart structure egress channel there is a communication connector through which the data output is transmitted. The smart structure egress channel may be accessed through an access extension which has a removable cover.

In a preferred embodiment, the bottom and top regions of the channel and side panels are curved.

In another preferred embodiment, the bottom and top regions of the channel and side panels are 'stepped' so as to conform to the multiple layers of laminated structures and to allow for sensing at multiple locations within the structure.

BRIEF DESCRIPTION OF THE DRAWINGS

FIG. 1a is a top view of the general location within an aircraft wing of a preferred embodiment of the smart structure egress channel.

FIG. 1b is a top view of the general appearance of sensors, and fiber optic cables of a preferred embodiment of the smart structure egress channel.

FIG. 2 is a perspective view featuring the major elements of a preferred embodiment of the smart structure egress channel.

FIG. 3 is a side view of a side panel of a preferred embodiment of the smart structure egress channel.

DETAILED DESCRIPTION OF THE INVENTION

Figure 4:
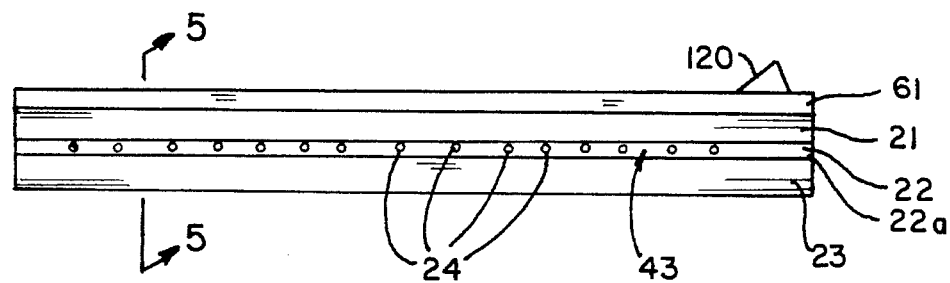
FIG. 4 is a side view of a component channel in a preferred embodiment of the smart structure egress channel.

Referring now to the drawings and initially to FIG. 1 there is illustrated a perspective view of the smart sensor egress channel and its general location within an aircraft. FIG. 1a shows the general location 4 of the smart structure egress channel within the body of a composite structure such as an aircraft wing (FIG. 1a). FIG. 1b reveals a variety of sensors 1 that are inserted into to the smart structure egress channel 3 by fiber optic transmission cable 2. Information or data is collected within the smart sensor egress channel 3 and then transmitted to an external location by the communication output line 5.

FIG. 2 provides a general perspective view of the eight major elements which constitute the smart structure egress channel. Each will be discussed in much greater detail in following paragraphs. The smart structure egress channel consists of two side panels 40 (only one can be seen in this diagram), double channels (20) extending laterally between the side panels (40), an access extension (60) extending laterally between the end panels parallel to but above the double channels 20, a cover (80) on top of the access extension 60, and a communication connector (120) disposed within one end of the access extension 60. The overall dimensions of the channel may vary depending on the specific aircraft or the location of the smart structure egress channel within the aircraft. Usually the length and width of the smart structure egress channel are significantly larger than its' height. In a suitable embodiment of the invention, the measurements of the smart structure egress channel are, for example, 10.00"×2.50"×0.31" (length × width × height).

Turning to a more detailed discussion of the major elements comprising the smart structure egress channel, FIG. 3 illustrates the side panels (40). A pair of identical side panels (40) are located opposite each other. The circumference of each side panel is defined by four sub-elements. The first sub-element is the rectangular top region (41). The second sub-element is the curved top region (42) sloping downward from (41). The third of the sub-elements are the vertical walls (43) connecting the curved top regions (42) to a fourth sub-element, i.e., a curved base region (44). Each side panel (40) is affixed perpendicularly on opposite ends of the next 2 elements, i.e., the channel (20) and access extension (60).

Figure 5:
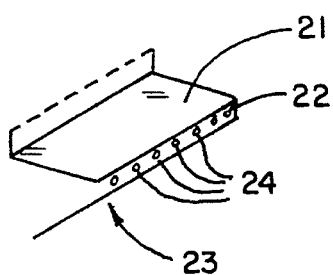
FIG. 5 is a perspective, cut-away view of a preferred embodiment of the smart structure egress channel.

The next major element in the smart structure egress channel is the double channel (20). The double channel 20 actually comprises a pair of identical channels extending parallel to, but on opposite sides of, the access extension (60). In the preferred embodiment, each component channel has several sub-elements as illustrated at FIGS. 4 and 5. The first sub-element is the surface (21) extending between a vertical wall 61 of the access extension 60 and the top edge 22 of vertical wall (43). Surfaces 21 and 21a are concaved to follow the contour of curved top region 42 of the side panel 40. The vertical wall 43 also has a bottom edge 22a from which extends surface 23 which like surface 21 is concaved but follows the contour of base region 44. Located in the vertical wall 43 is a plurality of holes 24 for receiving the fiber optic cables 2 shown in FIG. 16. These holes 24 are, a critical part of the smart structure egress channel. It is through these holes that the fiber optic cables transmit data from the various sensors (1) located inside the double channel 3. A typical hole size is 0.010" in diameter. This would accommodate a typical fiber optic cable used in military applications. However, the diameter can be adjusted depending on the size of the transmission cable preferred. The spacing of the holes can be varied. In the preferred embodiment the holes were approximately 0.5 inches apart. However, the spacing and location of the holes can be altered depending on the number and location of sensors which are to be accommodated. In an alternative embodiment, one or more of the two surfaces 21 and 23 may be concave.

Figure 6:
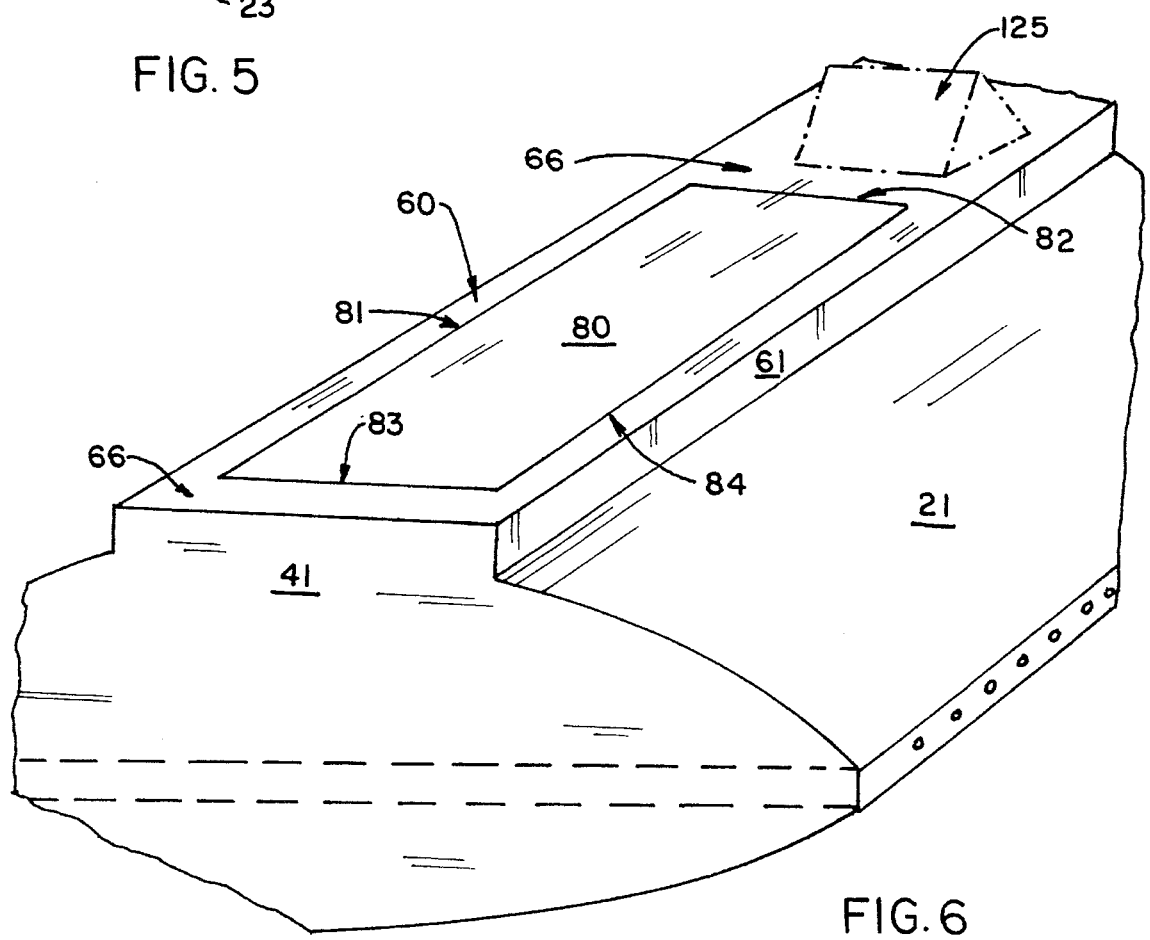
FIG. 6 is a perspective view of the access extension and access extension cover of a preferred embodiment of the smart structure egress channel.
Figure 7:
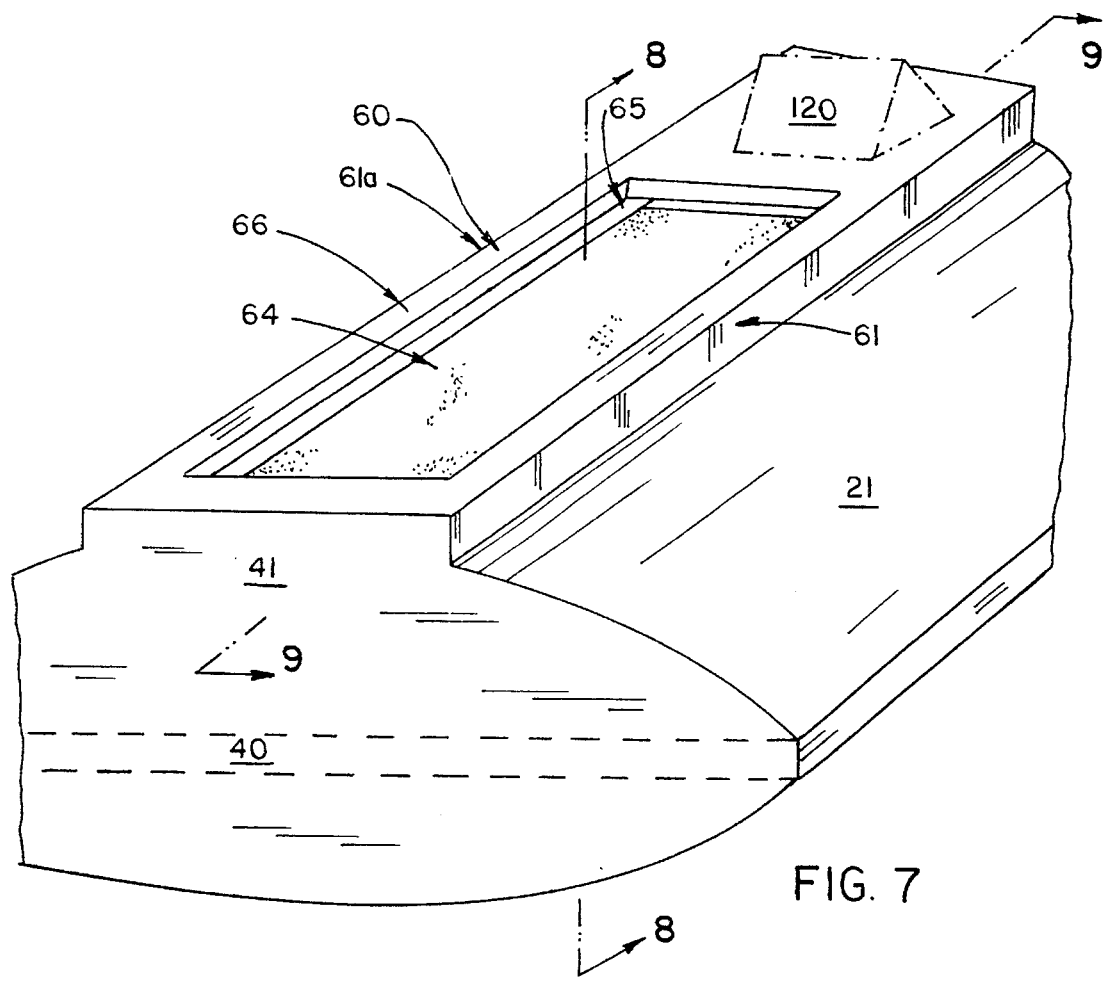
FIG. 7 is a perspective view of the access extension without the access extension cover of a preferred embodiment of the smart structure egress channel.

The access extension (60) is the next major element in the smart structure egress channel. The access extension consists of several sub-elements which are illustrated in FIGS. 6 and 7. The access extension (60) provides a critical advance over prior art because it creates a passage by which easy access can be gained into the interior of the smart structure egress channel. This allows the various sensor inputs to be reconfigured as required. The first major sub-elements of the access extension (60) are a pair of vertical walls 61 and 61a which run the length of the channel extending vertically from surfaces 21 and 21a, respectively. The vertical walls (61) and (61a) are identical rectangular walls located opposite of each other. The next sub-element of the access extension (60) is the rectangular top surface 66 which connects walls 61 and 61a to form the top region 41 shown in FIG. 3. Located within rectangular top region is the access extension aperture 64 shown in FIG. 7. This is a rectangular void within the rectangular top surface (66). The access extension aperture (64) is the access to the interior of the smart structure egress channel. Within the access extension aperture (64) and projecting as a ledge downward from top surface (66) is the final sub-element in the access extension, i.e., the step-ledge (65) for receiving access cover (80), which cover 80 can be used to cover the access extension aperture (64) as illustrated in FIG. 6. The step-ledge sub-element (65) shown in FIG. 7 provides a supporting surface onto which the access cover (80) can rest underneath top surface (66) while the top of cover (80) will be flush with surface 66.

The access extension cover (80) is rectangular and fits over the access extension aperture (64). When the access extension cover (80) is resting in the covering position, it seals the interior of the smart structure egress channel from external exposure. The cover (80) fits securely at sides 81 through 84 shown in FIG. 6.

Figure 10:
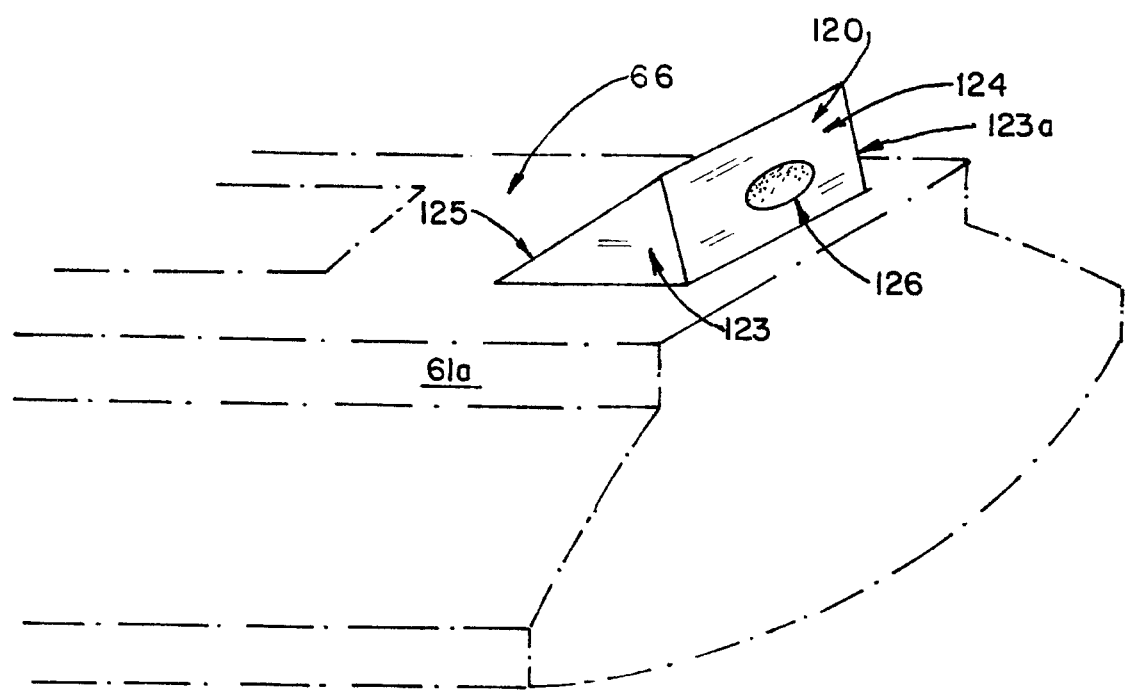
FIG. 10 is a perspective view of the communication connector of a preferred embodiment of the smart structure egress channel.
Figure 11:
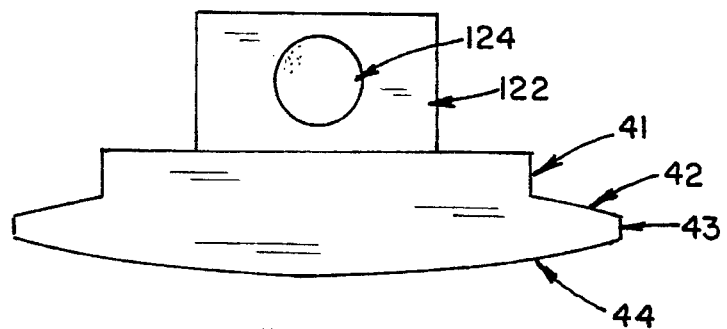
FIG. 11 is a cross-sectional end view of a preferred embodiment of the smart structure egress channel.

The next major element of the smart structure egress channel is the communication connector (120) shown in FIG. 10. The communication connector (120) is the passageway for transmitting data, from the smart structure egress channel, to another source. The plurality of holes (24) in the channel wall 43 as illustrated at FIGS. 4 and 5 provide multiple entry points for sensor data which after processing is then transmitted through the communication connector 120 and thus it provides a single departure point for this information. The communication connector 120 projects upward from the rectangular top surface 66 of the access extension element 60. The communication connector 120 has five sub-elements shown in FIG. 10. The first major sub-elements are a pair of triangular sides 123 and 123a which face one another. The triangular sides 123 and 123a are identical in shape. The triangular sides 123 and 123a are, at their base, affixed to top surface (66) of the access extension element 60. The next major sub-element of the communication connector 120 is its front surface (124). The front surface (124) is rectangularly shaped, and also affixed at its base to the rectangular top surface (66). This front surface 124 extends between the triangular sides 123 and 123a. There is a back surface 125, better illustrated at FIG. 6 which is attached to sides 123 and 123a and front surface 124 so as to form a pyramid projecting from top surface 66 of access extension 60. The angular design of the communications connector 120 will assist in accessing the departing data. The angular design also results in less of a bend in the data line which results in less signal loss. Located in the center of the front surface 124 is the next sub-element, i.e., the egress port (126). The egress port (126) is a rounded opening, large enough to accommodate cabling for data output. The diameter of egress port 126 may be as small as 0.375 inches. However, this dimension may vary as desired to accommodate the cabling.

Figure 8:
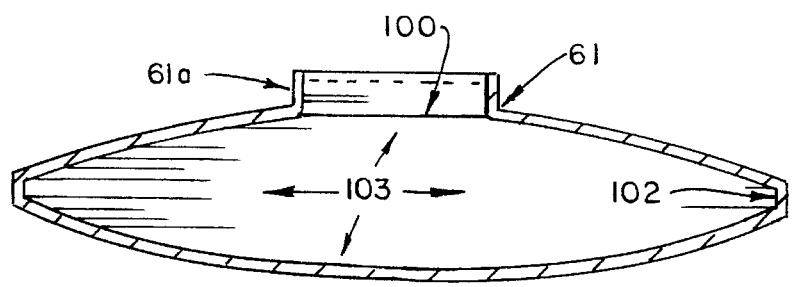
FIG. 8 is a cut-away view of the channel interior cavity of a preferred embodiment of the smart structure egress channel.
Figure 9:
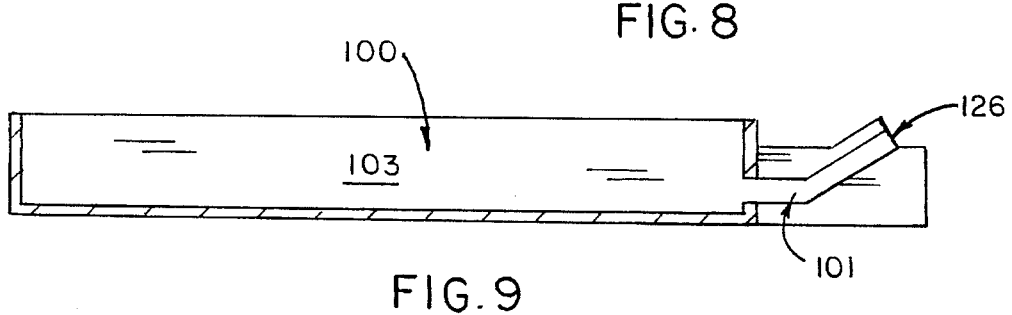
FIG. 9 is a cut-away view of the interior cavity of a preferred embodiment of the smart structure egress channel.

The final major element is the interior cavity 100 shown in FIGS. 8 and 9. The interior cavity 100 is the space that is enclosed by the smart structure egress channel. It has major sub-elements. The channel interior cavity sub-element (103) is the space within the access extension (60), channel (20), and side panels (40). Also, there are interior sensor holes 102 which are the continuation of holes 124 described at FIGS. 4 and 5, for fiber optic cables. Fiber optic cables may pass from outside the channel through the channel walls 43 and 43a and to the interior cavity (100). A major advance over the prior art is being able to access the channel interior cavity (103) the smart structure egress channel through access apertures 64 and perform service on the sensors and other devices therein located. The final sub-element of the interior cavity is the communication conduit 101 shown in FIG. 9. The communication conduit (101) is a passageway that connects the channel interior cavity (103) to the communication connector (120) and egress port 126. This is the conduit by which the data collected within the channel interior (103) cavity finally departs the smart structure egress channel.

Figure 12:
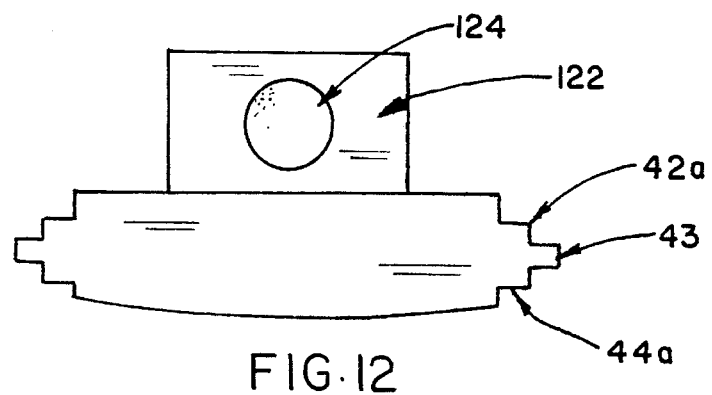
FIG. 12 is a cross-sectional end view of a another preferred embodiment of the smart structure egress channel.

A particularly preferred embodiment of the invention is a modification to the side panels (40) and channels (20) to conform with a laminated structure. FIG. 12 illustrates this preferred embodiment. In this preferred embodiment, the channel periphery defines a 'stepped' configuration at 42a, 43 and 44a so as to conform with various layers of a laminate such as airplane wings may have.

This stepped configuration offers several advantages. First it is possible to sense at multiple thicknesses in the structure. Second, the stepped configuration provides for better load transfer within the structure.

The material used to construct a smart structure egress channel varies but generally is composed of, for example, titanium—based alloys, polymer based materials and stainless steel. The materials depend on the application of the composite structure. For instance with composites that are polymer based the material used must be able to withstand processing temperatures between 300° to 750° F. and must not corrode aluminum.

The smart structure egress channel will reduce the cost of manufacturing because the resultant single egress reduces the need for specific hand labor and material. Without a single egress port, each sensor output departs from the composite structure by a separate egress fitting. The installation of each fitting is done by hand. The elimination of these egress fitting results in less material needed in the composite structure. This reduction results in a lighter composite structure. A lighter composite structure is advantageous with aircraft components. Besides lower manufacturing costs and lighter weight, long term maintenance costs will be reduced. A single egress point reduces the amount of time needed to access the sensor outputs during routine maintenance actions.

It is understood that the invention is not to be limited to the exact details of the device shown and described, as obvious modifications and equivalents will be apparent to one skilled in the art, and the invention is therefore to be limited only by the scope of the appended claims.

What is claimed is:

1. A smart structure egress channel for consolidating multiple sensor inputs in a multi-laminate structure into a single output comprising:
   a. a pair of opposing channels each comprising:
      (i) a rectangularly shaped top surface having a concave bend, said surface located to extend from a vertical wall of an access extension to a vertical channel wall; and
      (ii) said vertical channel wall containing a plurality of openings through which fiber optic cable carries information into an interior cavity, and said vertical channel wall having extended therefrom a concaved rectangular base surface opposite of the top surface; and
   b. a pair of opposing side panels, enclosing the ends of the channels, comprising:
      (i) a rectangular top region which is perpendicularly attached to the access extension; and
      (ii) a curved top region which is perpendicularly attached to and to follow the contour of the rectangular top surface of the channel; and
      (iii) a curved base region perpendicularly attached to and concaved to follow the contour of the channel base surface;
   c. said access extension comprising:
      a pair of opposing vertical wall regions each of which are parallel to and attached to the aforementioned channel top surfaces while being perpendicularly attached to the rectangular top regions of the side panels, and a rectangular top region a top the vertical side walls.

2. The structure of claim 1 having an access extension aperture comprising a rectangularly shaped void located in the rectangular top region.

3. The structure of claim 2 having a step-ledge located at the interface of said rectangular top region and the access extension aperture as a lower step down.

4. The structure of claim 2 having an access extension cover rectangularly shaped to fit onto the step ledge of the access extension.

5. The structure of claim 1 wherein the opposing channels, side panels and access extension define an interior cavity comprising;

(i) a plurality of lateral sensor holes which pass through the interior cavity to the vertical channel walls; and (ii) a communications conduit, greater in diameter than the sensor holes, said conduit having one end which terminates within the interior cavity and the other end which terminates on an egress port of a communication connector.

6. The structure of claim 5 wherein said communication connector is attached to the rectangular top region of the access extension and comprising;

(i) a top surface which is rectangular shaped and slanted towards the access extension aperture; and (ii) has two triangular vertical side walls and a front rectangular vertical side wall.

7. The structure of claim 5 wherein said egress port is a circular void located in the front rectangular side wall.

8. The apparatus of claim 1 wherein the material used is comprised of material selected from the group consisting of titanium, carbon-based epoxies and aluminum.

* * * * *